US011823521B2

(12) United States Patent
Pic et al.

(10) Patent No.: US 11,823,521 B2
(45) Date of Patent: Nov. 21, 2023

(54) IMAGE PROCESSING METHOD FOR AN IDENTITY DOCUMENT

(71) Applicant: SURYS, Bussy-Saint-Georges (FR)

(72) Inventors: Marc-Michel Pic, Boulogne-Billancourt (FR); Mohammed Amine Ouddan, Le Perreux sur Marne (FR); Gaël Mahfoudi, Capens (FR); Xavier Pic, Sillans-la-cascade (FR)

(73) Assignee: SURYS, Bussy-Saint-Georges (FR)

(*) Notice: Subject to any disclaimer, the term of this patent is extended or adjusted under 35 U.S.C. 154(b) by 0 days.

(21) Appl. No.: 17/604,962

(22) PCT Filed: Apr. 20, 2020

(86) PCT No.: PCT/EP2020/060963
§ 371 (c)(1),
(2) Date: Oct. 19, 2021

(87) PCT Pub. No.: WO2020/212619
PCT Pub. Date: Oct. 22, 2020

(65) Prior Publication Data
US 2022/0262150 A1 Aug. 18, 2022

(30) Foreign Application Priority Data
Apr. 19, 2019 (FR) ..................... 1904228

(51) Int. Cl.
*G06V 30/244* (2022.01)
*G06V 10/764* (2022.01)
(Continued)

(52) U.S. Cl.
CPC ............. *G07D 7/00* (2013.01); *G06V 10/764* (2022.01); *G06V 10/7747* (2022.01);
(Continued)

(58) Field of Classification Search
CPC .... G07D 7/00; G06V 10/7747; G06V 10/817; G06V 30/40; G06V 30/194;
(Continued)

(56) References Cited

U.S. PATENT DOCUMENTS

| 10,452,897 | B1* | 10/2019 | Benkreira | .............. G06V 40/40 |
| 2014/0348392 | A1* | 11/2014 | Burry | ..................... G06V 20/62 |
| | | | | 382/105 |
| 2019/0213408 | A1* | 7/2019 | Cali | ..................... G06V 30/413 |

FOREIGN PATENT DOCUMENTS

| EP | 3511868 A1 | 7/2019 |
| JP | 2011-178075 A | 9/2011 |
| WO | 2004/051917 A1 | 6/2004 |

OTHER PUBLICATIONS

Chernyshova et al.: "Optical Make Recognition in Smartphone-Capture Images, and its Application for ID Forgery Detection", Arxiv.org, Universty Library, 201 Olin Library Cornell University Ithaa, NY 14853, Oct. 18, 2018.
(Continued)

*Primary Examiner* — David F Dunphy
(74) *Attorney, Agent, or Firm* — TraskBritt (57) ABSTRACT

An image processing method, for an identity document that comprises a data page, comprises acquiring a digital image of the page of data of the identity document. The method further comprises assigning a class or a super-class to the candidate identity document via automatic classification of the digital image by a machine-learning algorithm trained beforehand on a set of reference images in a training phase; processing the digital image to obtain a set of at least one intermediate image the weight of which is lower than or equal to the weight of the digital image; applying discrimination to the intermediate image using a discriminator neural network; and generating an output signal as output from the discriminator neural network, the value of which is repre-
(Continued)

sentative of the probability that the candidate identity document is an authentic document or a fake.

11 Claims, 3 Drawing Sheets

(51) Int. Cl.
  *G06V 10/778* (2022.01)
  *G06V 10/82* (2022.01)
  *G06V 10/774* (2022.01)
  *G06V 10/80* (2022.01)
  *G07D 7/00* (2016.01)
  *G06V 30/40* (2022.01)
  *G06V 30/194* (2022.01)
  *G06V 30/10* (2022.01)

(52) U.S. Cl.
  CPC ........ *G06V 10/7796* (2022.01); *G06V 10/817* (2022.01); *G06V 10/82* (2022.01); *G06V 30/194* (2022.01); *G06V 30/245* (2022.01); *G06V 30/40* (2022.01); *G06V 30/10* (2022.01)

(58) Field of Classification Search
  CPC .. G06V 30/245; G06V 10/7796; G06V 10/82; G06V 10/764; G06V 30/10
  See application file for complete search history.

(56) References Cited

OTHER PUBLICATIONS

Chernyshova Yulia S et al.: "Generation method of synthesis data for mobile OCR system" Proceedings of SPIE; [Proceedings of SPIE ISSN 0277-786 X vol. 10524], SPIE, US, vol. 10696, Apr. 13, 2018 (Apr. 13, 2018), pp. 106962G-106962 G.

International Search Report for International Application No. PCT/EP2020/060963, dated Jun. 18, 2020, 7 pages with English translation.

International Written Opinion for International Application No. PCT/EP2020/060963, dated Jun. 18, 2020, 11 pages with English machine translation.

International Preliminary Report on Patentability for International Application No. PCT/EP2020/060963, completed Feb. 25, 2021, 22 pages with English translation.

\* cited by examiner

IMAGE PROCESSING METHOD FOR AN IDENTITY DOCUMENT

CROSS-REFERENCE TO RELATED APPLICATIONS

This application is a national phase entry under 35 U.S.C. § 371 of International Patent Application PCT/EP2020/060963, filed Apr. 20, 2020, designating the United States of America and published as International Patent Publication WO 2020/212619 A1 on Oct. 22, 2020, which claims the benefit under Article 8 of the Patent Cooperation Treaty to French Patent Application Serial No. FR1904228, filed Apr. 19, 2019.

TECHNICAL FIELD

The present disclosure relates to the field of processing images using deep learning with a view to verifying identity documents.

BACKGROUND

An identity document is assigned to a bearer. It comprises at least one page of data (or datapage for an identity document such as a passport) that is a page personalized to the bearer of the document and that comprises a (graphic) background, most often a photograph of the bearer, and variable data relating at least to the bearer.

An identity document may be official, i.e., issued by a state or an administrative authority, or unofficial.

The present disclosure essentially relates to official state identity documents, but may also be applied to any official document, notably, title deeds.

For sake of concision, the term "identity document" will be used below to refer to any official or unofficial document, whether an identity document or not, comprising invariant data, i.e., data the content and position of which are common to at least two identity documents, independently of the identity of the bearer of the identity document (for example, the wording of a field such as "nationality" on a passport or indeed a graphic security element such as a guilloche), and comprising variable data, i.e., data specific to one identity document (for example, the name of the bearer of the identity document).

Identity documents are of many natures (for example, passports, identity cards, residence cards, driving licenses, season tickets, etc.) and may originate from any issuing country.

For a given nature of document, there may be various types of identity document (for example, "ordinary" passports, "service" passports and "diplomatic" passports).

Certain identity documents comprise flawed fonts, which contain intentional and known errors, in particular in the serifs.

There may be a number of versions of a given type of identity document. For example, for a given country, there may be a number of versions of "ordinary" passports, in particular depending on their date of manufacture.

Identity documents may be categorized into a set of classes, such that each class is a unique combination notably of an identity-document nature, type and version.

An identity document may be authentic or fake, i.e., counterfeit or falsified.

A counterfeit identity document is created from scratch, for example by a state or by a counterfeiter. Depending on the means invested in the production of the counterfeit, it may be almost undetectable or relatively crude.

A falsified identity document is an authentic identity document one or more elements of which have been fraudulently modified.

By and large, falsifications generally correspond either to a modification of variable data, i.e., data relating to the bearer of the document or to the document itself (for example, the bearer's surname, his age, the expiration date of the document etc.), or to the replacement of the photograph of the bearer of the authentic identity document with the photograph of a third party.

Identity documents comprising flawed fonts are very difficult to falsify because the counterfeiter is unaware of the intentional errors.

Blank identity documents (i.e., identity documents that have not yet been officially personalized) that have been stolen and the personalization of which is fraudulent also exist; such documents are called blank stolen documents.

Now, there may be various variants of a given type of authentic identity document.

For example, two different versions of a given identity document may have differences in their manufacture without losing their authenticity or their validity at a given time.

Furthermore, when a new authentic identity document is issued, there are no fakes of the identity document.

Lastly, there are no or very few specimens of identity documents, especially official ones. These specimens are populated with identical personalizations, this making it difficult to use them as a dataset for training a deep-learning algorithm.

For each of these reasons, and a fortiori for all of them, the verification of an identity document is relatively complicated, and all the more so the closer the date of verification to the date of manufacture of the document or of the type of the document.

At the present time, the verification of an identity document is based on a human analysis and/or on a computer analysis based on a verification algorithm that requires not only a large quantity of authentic identity documents but also adaptation to each version and to each version form.

To overcome these problems, a solution based on artificial intelligence is proposed that aims to analyze at least the variable data of the identity document.

In this field, the document "Optical Font Recognition in Smartphone-Captured Images and its Applicability for ID Forgery Detection" is known (Chernyshova et al., 2018 Oct. 18, XP081143908, DOI: 10.1117/12.2522955). However, this document prescribes a digital-processing operation that aims to facilitate character recognition (OCR) and that examines all the characters of an alphabet.

Contrary to this teaching, the present disclosure relates to processing of each character considered individually, as described below.

BRIEF SUMMARY

More precisely, the disclosure relates, according to a first of its subjects, to a method for processing an image of a candidate identity document that comprises a page of data, the method comprising steps of:

acquiring a digital image of the page of data of the candidate identity document.

It is essentially characterized in that it further comprises:

assigning a class or a super-class to the candidate identity document via automatic classification of the digital image by a machine-learning algorithm trained beforehand on a set of reference images in a training phase, processing the digital image to obtain a set of at least one intermediate image the weight of which is lower than or equal to the weight of the digital image, applying discrimination to the intermediate image using a discriminator neural network, and generating an output signal as output from the discriminator neural network, the value of which is representative of the probability that the candidate identity document is an authentic document or a fake.

In one embodiment, the step of assigning a class or a super-class is carried out by an unsupervised learning algorithm, or by a pre-trained classifier neural network, which is preferably a convolutional neural network.

It is possible to provide, prior to the step of generating the output signal, steps of:

extracting a set of at least one zone among:
- a zone corresponding to all or some of the machine-readable zone of the candidate identity document,
- a zone corresponding to the op banner of the candidate identity document, and
- a zone corresponding to the exterior part of the candidate identity document, each zone comprising glyphs, of at least one given font or a similar graphic object, extracting each glyph from the set of at least one zone, via optical glyph recognition, saving each extracted glyph in the form of an individual image, and analyzing the typefaces of the extracted glyphs.

In one embodiment, each intermediate image is obtained via one among:
- a step of processing each individual image with a generator neural network,
- a step of processing each individual image with a recurrent neural network, and
- a step of post-processing each individual image.

In one embodiment, the generator first network is an autoencoder, preferably a convolutional autoencoder.

In one embodiment, the step of automatic classification comprises assigning a predetermined class depending on at least one of the following characteristics:
- the nature of the identity document;
- the country or state of origin of the identity document;
- the type of identity document; and
- the version or generation number of the identity document.

It is also possible to provide a step of data augmentation in the training phase.

In one embodiment, when the set of at least one zone comprises variable data, the method further comprises a step of blurring the variable data.

It is also possible to provide a step of inspecting optical security characteristics of the identity document.

According to another of its subjects, the present disclosure relates to a computer program comprising program-code instructions for executing the steps of the method according to the disclosure, when the program is executed on a computer.

By virtue of the present disclosure, the training may be carried out continuously, thus making it possible to enrich the database regularly, this limiting the risk of drift.

The present disclosure makes it unnecessary to train the system completely ex-nihilo, and it may advantageously be applied, using pre-trained networks, in particular to identity documents or to ad hoc images comprising the glyphs employed in identity documents.

Other features and advantages of the present disclosure will appear more clearly on reading the following description, which is given by way of an illustrative and non-limiting example with reference to the accompanying figures.

BRIEF DESCRIPTION OF THE DRAWINGS

The accompanying drawings illustrate embodiments of the disclosure.

DETAILED DESCRIPTION

The present disclosure is based on a solution involving artificial intelligence. Provision is made for a preliminary phase in which glyphs are learnt from authentic identity documents, then for an exploitation phase in which candidate identity documents are examined and in which there is preferably no training. The training process is therefore preferably continuous and the process of exploitation dissociated in time from the training process.

By "glyph," what is meant is one graphic representation (among an infinite possible number) of a typographic sign, or in other words of a character, that is, in particular, alphanumeric. In the context of the present disclosure, a glyph may also be a non-significative graphic representation, and notably a logo.

By "typeface," what is meant is a set of glyphs, i.e., visual representations of characters of a given family, that includes all sizes and weights of a given family, and the style of which is coordinated, in order to form an alphabet, or a complete and consistent representation of all the characters of a language.

By "font," what is meant is all the glyphs or characters corresponding to the same characteristics in terms of size, weight and italics within a given typeface.

For example:

Garamond is a typeface; and bold 12-point Garamond-Roman is a font.

As explained in more detail below:

"source image" is understood to mean a digital image of an authentic identity document or of a candidate identity document;

"reference image" is understood to mean all or some of the set of source images;

"individual image" is understood to mean an individual glyph extracted from a reference image; and "intermediate image" is understood to mean an image obtained via one among:

a step of processing an individual image with a generator neural network, a step of processing an individual image with a recurrent neural network, and a step of post-processing an individual image.

Acquisition

Figure 5:
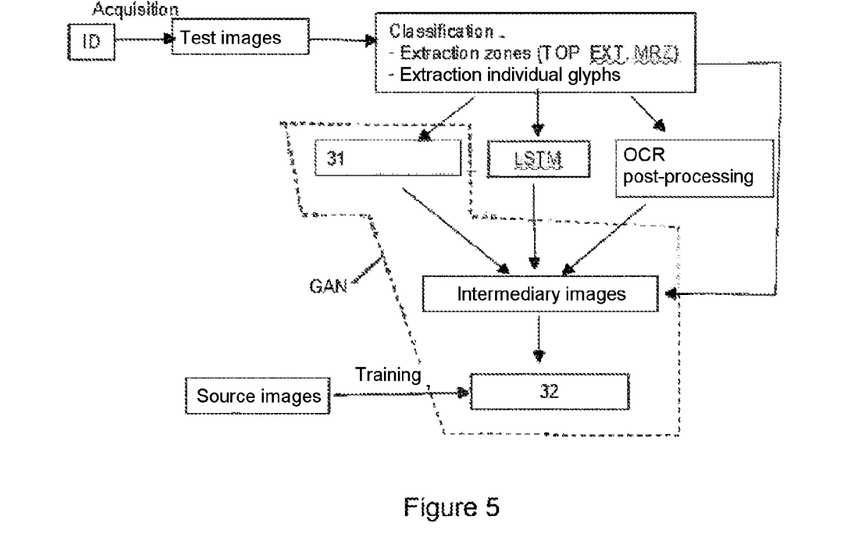
FIG. 5 illustrates a conceptual diagram of the disclosure.

A conceptual diagram of embodiment(s) of the disclosure is illustrated in FIG. 5 and described in detail below.

Provision is made to acquire a digital image of the page of data of an identity, document ID. This image is called a "source image" if it is of an authentic identity document used in the training phase and a "test image" if it is of a candidate identity document used in the exploitation phase.

The digital image of the page of data of a candidate identity document undergoes a set of image-processing operations, which are described below, and which make it possible to assess whether the candidate identity document belongs to one class or another, with a view to identifying the candidate identity document with the intention of authenticating it, i.e., of determining whether it is probably genuine or probably fake with a reasonable degree of confidence, i.e., a degree of confidence higher than a predetermined threshold value.

In the training phase, provision is made to store in a memory a set of source images obtained from a plurality of images of authentic identity documents.

In the present case, all or some of the set of source images is stored in the form of a database on a secure server and denoted "set of reference images" below. Provision may therefore be made for a step of selecting all or some of the set of source images with a view to generating the set of reference images.

In the present case, images of a plurality of identity documents defining a plurality of classes are acquired with a view to generating a set of reference images comprising, for example, a few tens of thousands of images. These images are obtained, for example, by extracting images from a video stream. Each video stream typically corresponds to the acquisition of the identity document under various conditions, for example various lighting angles, various viewing angles with and without flash, various luminosities, etc.

In the exploitation phase, provision is similarly made to acquire a set of test images comprising at least one test image. The set of test images may comprise a plurality of test images, which are obtained, for example, by extracting frames from a video stream.

With respect to both the source images and the test images, the video stream obtained, for example, by a communicating object, in particular a smartphone.

Data Augmentation

In the training phase, provision is made to carry out, on each source image, for example, extracted from the video stream, an optional step of data augmentation, allowing a larger dataset to be generated through modification of each image:

according to predetermined rules, in the present case color rules, this allowing various color palettes of various cameras to be anticipated, deformations, geometric deformations for example, corresponding to various angles of sight, different resolutions, this enabling the optical qualities of various devices to be anticipated, or resampling to limit the weight of the image to transfer, etc.

This amounts to simulating various conditions of acquisition of the identity document.

A set of reference images is thus obtained that, for example, comprises several tens of thousands of reference images per class of identity document, each class of identity document being authentic. The set of reference images is preferably one in number, i.e., it covers all the classes of identity document.

This large set of reference images will have been determined so as to make it possible to subsequently characterize, in the exploitation phase, candidate documents the image of which transmitted for analysis is of low resolution or indeed the colors of which have not been transcribed identically to the initially captured image, notably because of differences in the performance of the various acquisition systems available on the market or even because of aging of the document.

The set of reference images is obtained, for example, by acquiring images of a plurality of classes of documents taken by a communicating object. In the present case, the images are acquired by a smartphone, which is a communicating object that is advantageously used to implement embodiments of the disclosure.

In the exploitation phase, an optional step of data augmentation may also be provided, in a similar or identical manner to the step of data augmentation of the training phase.

Provision is then made for two main phases, a first phase of classification, for identifying the type of document, and a second phase of font recognition, for authenticating the document. The authentication of the document may be sequential with the classification. Alternatively, when the classification does not, by itself, allow a candidate identity document to be classified into a single class, the authentication may optionally allow a single class to be assigned. For example, the classification of an identity document is sometimes equivocal between two classes. For example, a diplomatic passport may be difficult to distinguish from an ordinary passport. Successive attempts at authentication with respect to each class may result in a higher degree of likelihood being obtained for one of the classes, and therefore in a decision being made. It is labeled classes that are compared. Classification may also be implemented if information on the type of document is available anyway, for example if this information is known at the time of authentication.

Identification of the Type of Identity Document

To determine the type of identity document, provision is made, both in the training phase and in the exploitation phase, for a classifying step.

A first step of the classification consists in classifying all of the reference images in the training phase and all of the candidate images in the exploitation phase into a set of predetermined classes, preferably via supervised learning and, for example, using a convolutional neural network ID (better known by the acronym CNN). In the present case, the VGG-16 neural network developed by the Visual Geometry Group of Oxford University, which is a pre-trained multi-stage classifier neural network is employed. Advantageously, a VGG-16 neural network may easily be installed on a smartphone, because the size of the file representing the weights of this network is able to be kept reasonable for the installation processes, this not necessarily being feasible with more complex neural networks, with more bulky files.

Most systems for identifying documents are based on reading and interpreting first glyphs of the machine-readable zone (MRZ), which contain the type of document, the issuing country, and the date of issue of the identity document.

The classification used here allows the class of a given document to be identified automatically, even if the MRZ is illegible or truncated, and independently of the photograph of the bearer of the identity document since the photograph is not extracted for the classification.

The classes are predetermined, for example depending on intrinsic and/or extrinsic characteristics of the documents.

For example, for an identity document such as a passport:
a first characteristic corresponds to the nature of the identity document: passport, identity card, etc.;
a second characteristic corresponds to the country or state of origin of the identity document: for example, France, the Netherlands, etc.
a third characteristic corresponds to the type of identity document: diplomatic, ordinary, etc.
a fourth characteristic corresponds to the version or to the generation of the identity document: for example, 6th generation; etc.

The combination of all or some of these characteristics allows a set of classes to be defined beforehand, for example:
a first class for a 6th generation diplomatic French passport,
a second class for a 6th generation ordinary French passport,
a third class for a 6th generation diplomatic Dutch passport,
etc.

For other identity documents, a driving license for example; other classes are defined, optionally based on other characteristics, for example, country, vehicle category, version, etc.

Each authentic document belongs to a single class. This class may be learnt or declared in the training phase.

Provision may also be made to define beforehand a set of super-classes such that each super-class is a combination notably of a nature and of at least one among: a set of at least one type; and a set of at least one version of identity document. Specifically, it is sometimes difficult to quickly differentiate an ordinary passport from a diplomatic passport, just as it is difficult to distinguish between two different versions of a given type of document.

In the exploitation phase, the neural network implemented, in the present case a VGG-16 neural network, therefore allows either a class to be assigned to a candidate identity document, or, failing that, a super-class to be assigned to it. Other neural networks may be implemented, for example Inception v3, etc.

Extraction

For the classification, provision is made to extract certain predetermined zones from the page of data of the identity document.

In the present case, provision is made to select the following three (3) zones:
a zone corresponding to all or some of the MRZ,
a zone corresponding to the top banner TOP of the identity document, and
a zone corresponding to the exterior part EXT of the identity document.

The 3 zones provided may comprise various glyphs in various fonts.

As already mentioned, MRZ is the acronym of machine-readable zone. The MRZ is the zone on an official document that is machine readable, and is reserved for reading, identification and validation of this document. In all documents meeting the recommendations of standard ICAO 9303-2 version 7, the MRZ is of 23.2 mm. The width of the footer zone of the document is the width of the document itself (height and width considered in "landscape" configuration).

By extension, if there is no MRZ in the above sense, by MRZ what is meant is any zone of predefined width and height, the height being calculated from the lower limit of the identity document and the width being calculated from the left- or right-hand end of the identity document, the latter being observed in the reading direction.

The top banner TOP comprises variable or set data, for example for a French passport, the terms "passeport" and "REPUBLIQUE FRANCAISE," the passport number, the type of passport and the code of the issuing country.

By extension, by TOP what is meant is any zone of predefined width and height, the height being calculated from the upper limit of the identity document and the width being calculated from the left- or right-hand end of the identity document, the latter being observed in the reading direction.

The exterior part EXT of the identity document also comprises variable or set data, typically a field header (set data) and the value of this field (variable data), for example the field header "eye color" (set data) and the value of this field (variable data), "green" for example. It covers the height of the identity document, over a predetermined width stored in a memory, the width being determined from the right-hand edge or left-hand edge of the identity document, the latter being observed in the reading direction.

Figure 1:
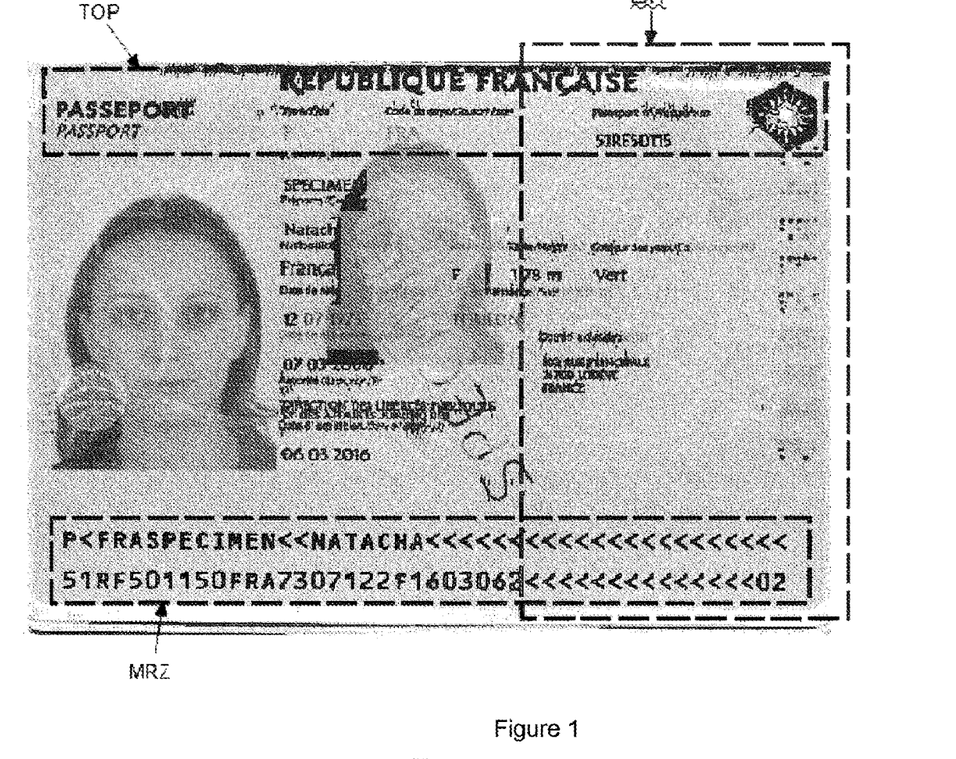
FIG. 1 illustrates one embodiment of a passport datapage.
Figure 2:
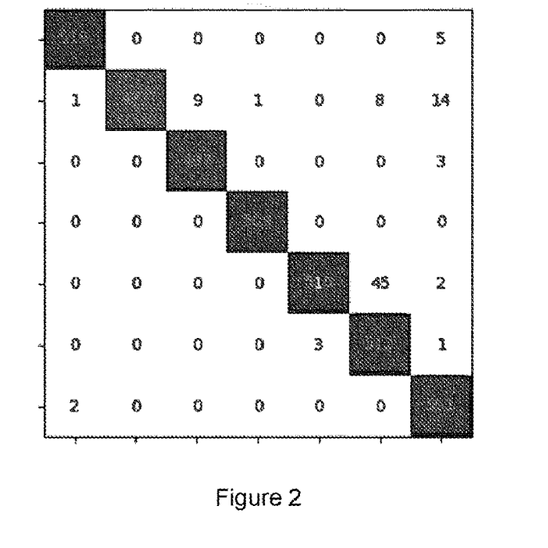
FIG. 2 illustrates a confusion matrix according to one embodiment of the method according to the disclosure.

For example, the left-hand portion of an identity document usually comprises a photograph of the bearer. In this case, the exterior part EXT is the zone within the dashed lines in FIG. 2. Conversely, sometimes the right-hand portion of the identity document comprises a photograph of the bearer. In this case (not illustrated) the exterior part EXT is located on the left-hand side of the identity document.

Advantageously, the position of the variable-data zones is known, for example from ICAO doc. series 9303, which is accessible, for example, at the address https://www.icao.int/publications/pages/publication.aspx?docnum=9303.

Preferably, provision is made, in the training phase, for a step of blurring the variable data, in order to avoid overtraining, i.e., so that the training of the system is based on invariant characteristics of the image and not on text elements that generally vary from one identity document to the next.

A step is then provided in which the neural network is trained on at least one of these three (3) zones (MRZ, TOP and EXT) of all or some of all of the reference images.

Provision may be made to split the data available for the training into two datasets, one set of which is used for the training and the other set of which is used to qualify the effectiveness of the training.

The training phase aims to determine the class of a candidate identity document to which the neural network is applied.

However, neural methods are not 100% reliable, and hence assignment of membership of a candidate identity document to a plurality of classes, or an inability to assign a class to a candidate identity document remains possible.

In the case where at least some of the set of reference images comprises a plurality of identity documents of the same type but of different versions, it is also possible to determine how the candidate document is situated in the class of identity documents.

To determine the authenticity of a candidate identity document classified into a single predetermined class, at least one of the following two processing operations must then be implemented:
a processing operation carried out to detect any manipulation of the fonts of the glyphs, and a processing operation carried out to detect any manipulation of the image.

For an identity document classified into a plurality of classes, at least one of the above two processing operations is carried out for each class of the document. The result of the authentication may ultimately allow the class of the identity document to be determined.

Recognition of the Fonts of the Glyphs

Provision is made for a step of recognition of the fonts of glyphs in each of the extracted (not blurred) zones.

It is a question of separating and learning each glyph of each font in each zone. Each glyph is therefore learnt individually. It will moreover be noted that there may be a plurality of fonts per zone.

As a general rule, the font of the MRZ is standardized and should be OCR-B. Nevertheless, there may be a plurality of variants of this font and sometimes it is not OCR-B.

Furthermore, the fonts of the other zones are not standardized and a certain number of countries use dedicated private fonts. An identity document may be manufactured with special fonts, i.e., fonts that are as such not commercially available beforehand. Certain special fonts may be modified versions of pre-existing commercially available fonts. The expression "flawed fonts" is used to refer to a particular category of these fonts, in which elements such as the serif bars of certain glyphs are intentionally omitted or unduly added with abnormal orientations in order to create a visible (but discreet) differentiation with respect to the original font.

Lastly, it will be noted that the (inkjet, laser, inter alia) printing mode, in combination with the nature of the substrate of the printing medium (natural, synthetic, or plastic paper) may also slightly transform the printed aspect of the initial font.

In the training phase, provision is therefore made to learn each of the glyphs of each of the alphabets of each of the identity documents of the reference set, i.e., of each class. Each glyph is learnt individually, for each font of each class, when the class of the authentic identity document is known. Unlike the training described above, the image zones used for this processing are not blurred. Preferably, the training is carried out with a plurality of authentic identity documents rather than on a single specimen, so as to have the maximum number of different glyphs, and under different conditions, this optimizes the training.

The glyph-recognition step consists in extracting each of the glyphs from each text field via optical character recognition (OCR) 20, in all the zones.

Each extracted glyph is stored in the form of an individual image, corresponding to a segment of the source image or of the test image. A segmented image is therefore a portion of the source image or of the test image comprising a single glyph.

For example, it is possible to employ the software package Tesseract, the development of which is currently sponsored by Google, and which allows each glyph to be extracted individually using bounding boxes.

There is therefore not necessarily any clipping of the glyphs. However, provision may be made for a step of cleaning the glyphs, this consisting in clipping the glyph, i.e., isolating the glyph from its background.

At this stage, each individual glyph is therefore an individual image.

Provision is then made to create an intermediate image, according to any one of the three (3) variants below, each intermediate image being an individual image or the result of a processing operation applied to a respective individual image.

1st Variant: Autoencoder

In a first variant, provision is made for a first neural network 31 that is a generator network fed, by way of input, with a set of specimens (exemplars) of a single glyph, which are extracted in the form of individual images from the one or more source images or the test image, the network being configured to output a set of intermediate images.

In the present case, each individual image input into the generator corresponds to one individual glyph.

In the present case, the first network (generator) 31 is an autoencoder, i.e., an artificial neural network used for unsupervised learning of discriminating characteristics.

Preferably, provision is made for a plurality of autoencoders, in the present case placed in parallel, each autoencoder possessing a respective kernel, allowing a respective precision to be obtained. Each autoencoder is fed, by way of input, with the same image resulting from the step of recognition of the fonts of glyphs, and outputs a respective output image.

Figure 6:
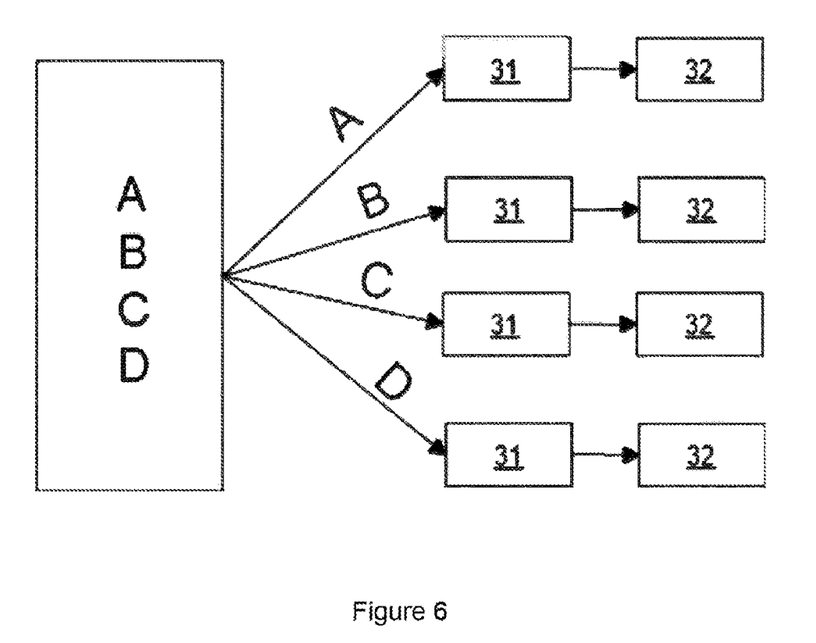
FIG. 6 illustrates a block diagram of a GAN according to the disclosure.

In the present case, there are as many autoencoders as there are types of glyphs (one autoencoder for all the letters "a," another autoencoder for all the letters "b," etc.). Likewise, provision is made for one discriminator network (described below) per type of glyph, as illustrated in FIG. 6.

In this case, the intermediate image corresponding to the individual glyph resulting from the step of recognition of the fonts of glyphs and input into the set of autoencoders is the result of the superposition of the output images of the set of autoencoders.

An autoencoder has two parts: an encoder 311 and a decoder 312. Preferably, the autoencoder is a convolutional autoencoder.

The encoder comprises a set of layers of neurons that process the input data in order to construct new representations 33 that are said to be "encoded," and that together form a new, more compact representation of the dataset, i.e., one with fewer descriptors, this making it possible to decrease the dimensionality of the dataset.

The decoder comprises another set of layers of neurons that receive the representations of the dataset output from the encoder and that, in turn, process them in an attempt to reconstruct the input data.

In the present case, each pixel of each glyph of each alphabet is one input datum. At the output of the encoder, the representation of the dataset is more compact, for example by a factor of 100.

Figure 3:
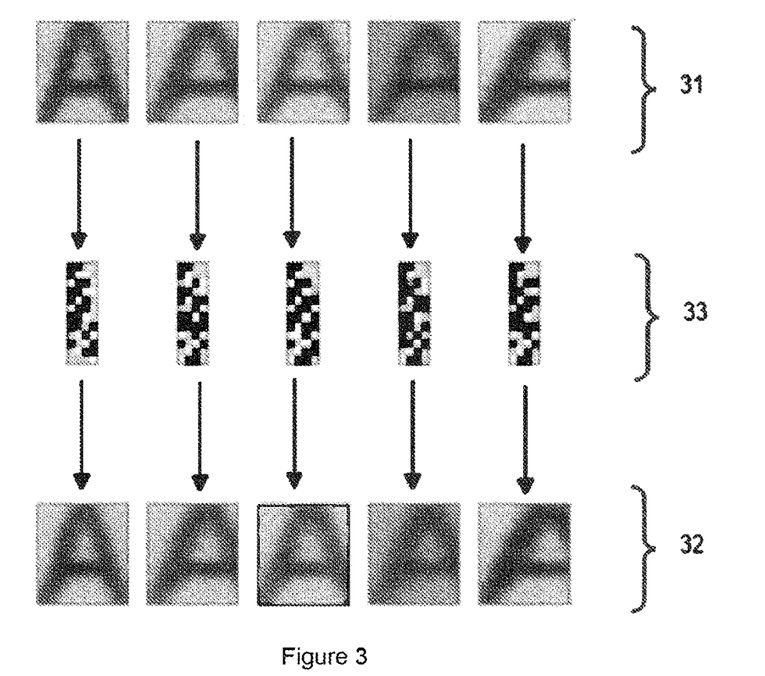
FIG. 3 illustrates a glyph "A" at the input of a generator first network and at the output of the discriminator second network, according to one embodiment of the disclosure.
Figure 4:
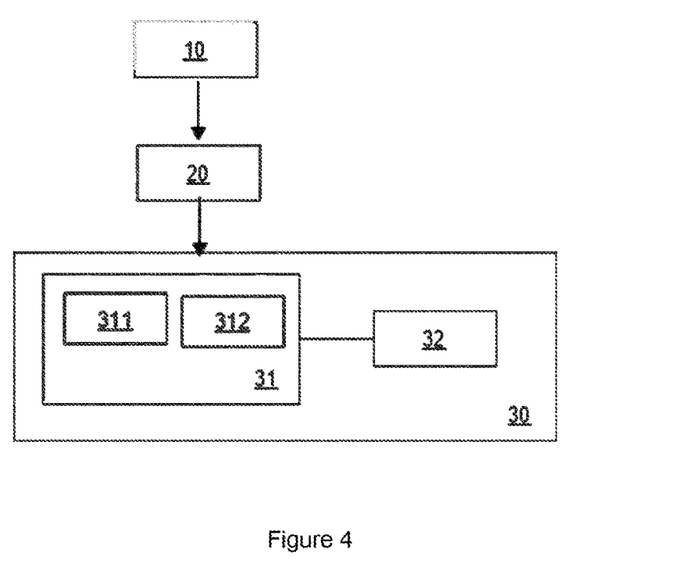
FIG. 4 illustrates one embodiment of the method according to the disclosure.

For example, trials have been carried out and are illustrated in FIG. 3. The $1^{st}$ row of FIG. 3 illustrates a set of individual glyphs resulting from the glyph-recognition step, in the present case glyphs "A," as input into an autoencoder 31.

The $2^{nd}$ row of FIG. 3 illustrates the set of encoded images 33, in the present case encoded on 36 bytes and represented by color codes, output by the autoencoder 31.

The last row of FIG. 3 illustrates the individual glyphs reconstructed by a discriminator network 32 from the encoded images 33.

Preferably, provision is also made for a step of data augmentation to be carried out on all of the encoded images 33, this, for example, being done by generating noise in the encoded images 33, this, for example, making it possible to simulate aging of an identity document, the way in which the identity document is perceived by various sensors, etc. This data augmentation therefore differs from the data augmentation described above and that related to the optical conditions of capture of the images of the identity documents.

Preferably, the augmented encoded images 33 participate in the phase of training the autoencoder.

Each individual glyph resulting from the step of recognition of the fonts of glyphs is input into the autoencoder.

In this first variant, a set of intermediate images is output from the autoencoder, each intermediate image corresponding to one individual glyph.

In this first variant, the autoencoder 31 and the second discriminator network 32, which is adversarial to the generator and described below because common to the three (3) variants, are generative adversarial networks or GANs, which are a class of unsupervised learning algorithms.

Conventional GANs (https://en.wikipedia.org/wiki/Generative_adversarial_network) employ back-propagation from the discriminator network to the generator network. A "GAN," within the context of the present disclosure, also comprises a generator network and a discriminator network but, unlike conventional GAN networks, does not employ back-propagation.

In the present case, there is, per glyph, one generator network, in particular one autoencoder 31, which learns the single glyph (the latter being extracted, in the form of individual images, from the one or more source images), and which generates a set of respective intermediate images.

In the training phase, per glyph, the discriminator network 32 is fed both with the set of individual images from the one or more source images, which are "genuine" images, and with the set of respective intermediate images, which are variants of the "genuine" images.

In the training phase, per glyph, the discriminator network 32 is also fed with a set of the same glyphs but known to be "fake."

Training is thus by triplet loss (https://en.wikipedia.org/wiki/Triplet_loss), in which the distance, or margin, a is defined as a predetermined threshold value.

According to the disclosure, there is therefore one GAN per glyph (one GAN for all the letters "a," one GAN for all the letters "b," etc.).

In a GAN, two networks are made to compete. The first network 31 is a generator fed, by way of input, with a set of glyphs, which are extracted in the form of individual images from the source image or the test image, the network being configured to output a set of intermediate images.

In the training phase, identical images are input into and output from the autoencoder, this making it possible to adjust the weights of the neural network by back-propagation. The training phase adjusts the weights of the VGG16 network for each glyph of each typeface. This is equivalent to each extracted glyph being introduced into its own discriminator network.

The training ends when the number of values recognized as genuine by the discriminator network is higher than a predetermined threshold value.

In the exploitation phase, only the discriminator network is used. It is fed with a set of test images and determines, on the basis of its training, whether the glyph of the test image that it receives as input is "genuine" or "fake."

Provision may also be made for a step consisting in transforming the space of representation of the intermediate image.

In the present case, provision is made to convert the intermediate image from the RGB space to the CIE 1976 L*a*b* color space, the latter generally being called the CIELAB color space, which expresses colors in cylindrical coordinates. Alternatively, provision may be made to use spherical coding, logarithmic coding, inter alia.

Transforming the space of representation allows weak signals to be enhanced, and therefore fake identity documents to be able to be detected more easily. In the present case, the transformation to the CIELAB space makes it possible to detect the colored spots present in the superposition of the various images in the case of fake identity documents, in particular, when the authentic font is a "flawed font" and deliberately differs, for example, in the presence or absence of serif lines on certain edges of the characters.

$2^{nd}$ Variant: LSTM

In a second variant, provision is made for a recurrent neural network, or "LSTM" (acronym of long short-term memory), which is fed, by way of input, with a set of glyphs extracted in the form of individual images from the source image or test image, and which makes it possible to obtain as output, by cosegmentation, a set of intermediate images that each correspond to a very good segmentation of the glyph obtained at the end of the glyph-recognition step. This variant is particularly applicable during the acquisition of video or image sequences of the original identity document and when it is possible to reconstitute a sequentiality between the glyphs of the same category.

The intermediate image is the result of an assembly of superimposed images resulting from a sequence of source or test images.

In this variant, the cosegmentation implies that each intermediate image obtained as output from the LSTM is obtained by processing a sequence of segmented images, where each segmented image of the sequence comprises the same individual glyph resulting from the glyph-recognition step.

A sequence of segmented images represents the variation of a glyph over the time of their acquisition. For a given sequence, each segmented image of the sequence corresponds to a given glyph of a respective source image, where each respective source image corresponds to a single augmented source image.

A sequence of segmented images is therefore input into the LSTM. A single intermediate image is output from the LSTM, this intermediate image being generated from the sequence of segmented images input into the LSTM and corresponding to the most probable outline of the glyph, and therefore to the one that is most distinguishable or identifiable vis-à-vis the original.

$3^{rd}$ Variant: OCR Post-Processing

In a third variant, provision is made for a step of post-processing the image resulting from the glyph-recognition step.

In this variant, each intermediate image obtained as output from the post-processing is obtained by processing a single segmented source or test image that comprises a given individual glyph resulting from the glyph-recognition step.

The post-processing step consists in improving the visual quality of the image resulting from the glyph-recognition step, for example via rotation, resizing, straightening, removal of aberrant points, etc.

This step allows the dispersion of fake identity documents with respect to the centroid of the cloud of genuine identity documents to be increased.

Apart from the 3 variants described above, provision may also be made for an invariant function, i.e., it is possible to make provision to directly input individual images of each individual glyph into the discriminator network described below, each individual image then being an intermediate image.

Provision may also be made to successively implement any two variants among the above three variants, or even all three variants, for decision making based on three times as many indices.

Discriminator Network 32

An identity document is authenticated by a neural network called the discriminator network 32 that, in its training phase, is fed, by way of input, with a set of intermediate images according to any one of the above variants.

For example, the discriminator network 32 is the discriminator network of a GAN such as described above. As also described above, provision may be made for a plurality of discriminator networks 32, one per type of glyph. However, for the sake of concision, only one discriminator network 32 will be described.

Preferably, the discriminator network is a convolutional neural network 10. In the present case, the VGG-16 neural network is employed. Training the discriminator network with source images allows any manipulation of the fonts of the glyphs in test images to be detected, with a view to detecting any potential manipulation of the identity document. It is also possible to train the discriminator network with test images.

The discriminator is configured to detect whether the sample is real or whether it has been generated by the generator. The training of the neural network "ends" when the discriminator is no longer able to distinguish an encoded image (generated by the encoder 311) from a real image, i.e., one belonging to the set of reference images.

Authentication

For each individual glyph an intermediate image of which is fed, by way of the input, into the discriminator network 32, the discriminator network 32 has two output levels: a first output level at which the individual glyph is considered to probably be authentic, and a second output level at which the individual glyph is considered to probably be fake.

An individual glyph is considered to probably be authentic when it corresponds to a glyph learnt in the training phase, i.e., when its discriminator network is no longer able to tell the difference between the individual glyph and the corresponding learnt glyph.

An identity document contains a plurality of glyphs in a plurality of fonts. For any one candidate identity document, it may therefore be advantageous to employ a combination of the output levels of the discriminator networks 32 for all of the intermediate images and to generate an overall output signal corresponding to a predefined mathematical function meaning that the candidate identity document is probably authentic or probably fake with a higher level of certainty. This function may be implemented, for example, by means of a majority vote, a qualified vote, a weighted vote, etc.

For example, the authenticity of a candidate identity document will possibly be evaluated by taking a ratio of the number of glyphs recognized as valid to the number of glyphs recognized as invalid in the document, or to the total number of recognized characters, possibly followed by a step of thresholding the ratio.

The overall result may also be weighted by assigning the glyphs an individual weight depending on the zone from which they are extracted. For example, a glyph "A" in the zone MRZ may have a different weight to a glyph "A" in the zone TOP.

Neural-network based learning may also be used to optimize these relative weights.

Embodiments of the present disclosure may be implemented on glyphs other than printed glyphs; for example, it is applicable to perforated fonts or even to logos, Specifically, a sufficiently contrasted logo of small size is similar to a character of a font.

Advantageously, embodiments of the present disclosure may be implemented by a communicating object, in particular a smartphone.

The invention claimed is:

1. A method for processing an image of a candidate identity document that comprises a page of data comprising a plurality of glyphs of a plurality of fonts, the method comprising a step of:
   acquiring a digital image of the page of data of the candidate identity document, each digital image being able furthermore to be extracted from a video stream recorded by said communicating object;
characterized in that it further comprises steps of:
   assigning a class or a super-class to the candidate identity document via automatic classification of said digital image by a machine-learning algorithm trained on a set of reference images in a training phase during which each glyph is learnt individually for each font of each class,
   extracting a set of glyphs from the digital image and storing each glyph in the form of an individual image,
   processing each individual image in order to obtain a set of at least one intermediate image, each intermediate image corresponding to one individual glyph, each intermediate image being obtained via at least one step comprising processing each individual image with a recurrent neural network, wherein processing each individual image with the recurrent neural network includes obtaining as output, by cosegmentation, a set of intermediate images that each correspond to a segmentation of the glyph obtained at the end of a glyph-recognition step,
   discriminating between each glyph of each font of said intermediate image using a respective discriminator neural network, each individual glyph being considered to be probably authentic when it corresponds to a glyph learnt in a training phase, and
   generating an output signal by combining the output signals of the discriminator neural networks, the value of which is representative of the probability that the candidate identity document is an authentic identity document or a fake.

2. The method of claim 1, wherein the step of assigning a class or a super-class is carried out by an unsupervised learning algorithm or by a pre-trained classifier neural network.

3. The method of claim 2, wherein the step of assigning a class or a super-class is carried out by the pre-trained classifier neural network, and the pre-trained classifier neural network is a convolutional neural network.

4. The method of claim 1, further comprising, prior to the step of generating the output signal, steps of:
   extracting a set of at least one zone among:
      a zone corresponding to all or some of the machine-readable zone (MRZ) of the candidate identity document,
      a zone corresponding to the top banner (TOP) of the candidate identity document, and
      a zone corresponding to the exterior part (EXT) of the candidate identity document,
   each zone comprising glyphs, of at least one given font, individually extracting each glyph from the set of at least one zone, via optical glyph recognition, and
comparing each extracted glyph to its corresponding glyph learnt in the training phase.

5. The method of claim 4, further comprising, when the set of at least one zone comprises variable data, a step of blurring the variable data in the training phase.

6. The method of claim 1, wherein the step of automatic classification comprises assigning a predetermined class depending on at least one of the following characteristics:
the nature of the identity document;
the country or state of origin of the identity document;
the type of identity document;
the version or generation number of the identity document.

7. The method of claim 1, further comprising a step of data augmentation in the training phase.

8. The method of claim 1, wherein the output signal is one among:
a majority vote,
a qualified vote, and
a weighted vote
of the signals output from the discriminator neural networks.

9. The method of claim 1, further comprising a step of inspecting optical security characteristics of the identity document.

10. A computer program stored in a non-transitory computer readable medium, the computer program comprising program-code instructions for executing the steps of the method of claim 1, when said program is executed on a computer.

11. The method of claim 1, wherein acquiring a digital image of the page of data of the candidate identity document comprises acquiring the digital image of the page of data of the candidate identity document with a communicating object.

* * * * *

UNITED STATES PATENT AND TRADEMARK OFFICE
CERTIFICATE OF CORRECTION

| | | |
|---|---|---|
| PATENT NO. | : 11,823,521 B2 | Page 1 of 1 |
| APPLICATION NO. | : 17/604962 | |
| DATED | : November 21, 2023 | |
| INVENTOR(S) | : Pic et al. | |

It is certified that error appears in the above-identified patent and that said Letters Patent is hereby corrected as shown below:

In the Specification

| | | |
|---|---|---|
| Column 3, | Line 22, | change "to the op banner" to --to the top banner-- |
| Column 3, | Line 28, | change "extracting each glyph" to --individually extracting each glyph-- |
| Column 5, | Line 8, | change "an identity, document ID." to --an identity document ID.-- |
| Column 5, | Line 47, | change "stream obtained, for" to --stream is obtained, for-- |
| Column 6, | Line 51, | change "neural network ID" to --neural network 10-- |
| Column 11, | Line 37, | change "margin, a is" to --margin, $\alpha$ is-- |
| Column 14, | Lines 3-4, | change "to logos, Specifically, a" to --to logos. Specifically, a-- |

Signed and Sealed this
Twenty-fourth Day of December, 2024

Derrick Brent
*Acting Director of the United States Patent and Trademark Office*